United States Patent
Gartside et al.

(10) Patent No.: US 10,985,516 B1
(45) Date of Patent: Apr. 20, 2021

(54) OUTLET WALL PLATE CHARGER APPARATUS

(71) Applicants: Nicholas Gartside, Frisco, TX (US); Zechariah Jones, Anna, TX (US)

(72) Inventors: Nicholas Gartside, Frisco, TX (US); Zechariah Jones, Anna, TX (US)

( * ) Notice: Subject to any disclaimer, the term of this patent is extended or adjusted under 35 U.S.C. 154(b) by 0 days.

(21) Appl. No.: 16/656,831

(22) Filed: Oct. 18, 2019

(51) Int. Cl.
  *H01R 25/00* (2006.01)
  *H01R 13/70* (2006.01)
  *H02J 7/00* (2006.01)

(52) U.S. Cl.
  CPC ........... *H01R 25/006* (2013.01); *H01R 13/70* (2013.01); *H02J 7/00036* (2020.01); *H02J 2207/40* (2020.01)

(58) Field of Classification Search
  CPC ........ H02J 7/0042; H02J 7/355; H02J 7/0036; H01R 25/006; H01R 13/70
  USPC .......... 320/107, 111, 115; 439/373, 638, 655
  See application file for complete search history.

(56) References Cited

U.S. PATENT DOCUMENTS

| | | | | |
|---|---|---|---|---|
| 7,140,922 B2* | 11/2006 | Luu | | H01R 31/065 439/651 |
| 8,011,930 B2* | 9/2011 | Lee | | H01R 13/6675 439/18 |
| 8,052,486 B2* | 11/2011 | Lee | | H01R 35/02 439/682 |
| 8,415,920 B2* | 4/2013 | Liao | | H02J 7/0042 16/225 |
| 9,024,581 B2* | 5/2015 | McGinley | | H02J 7/0042 320/111 |
| 9,732,921 B2* | 8/2017 | Chien | | H02G 3/14 |
| 10,505,326 B2* | 12/2019 | Chien | | A61L 9/03 |
| 2008/0085617 A1* | 4/2008 | Bevirt | | H04R 1/1025 439/104 |
| 2010/0315036 A1* | 12/2010 | Liao | | H02J 7/0042 320/107 |
| 2012/0007555 A1* | 1/2012 | Bukow | | H02J 7/0044 320/110 |
| 2014/0030912 A1* | 1/2014 | Cohen | | H04M 1/04 439/529 |

* cited by examiner

*Primary Examiner* — Gary F Paumen
(74) *Attorney, Agent, or Firm* — The Rapacke Law Group P.A.

(57) ABSTRACT

The present embodiments disclose an outlet wall plate charger apparatus. The outlet wall plate charger apparatus includes a wall plate having a lower portion and an upper portion. The lower portion includes a mounting aperture and an outlet aperture extending therethrough. The upper portion protrudes from the lower portion to define an upper cavity and includes a top face having at least one cord slot. A charger includes a charger body dimensioned to fit within the upper cavity and a pair of plug blades extending from the charger body. An upper face of the charger body has at least one cable port, each being configured to receive a charging cable.

17 Claims, 4 Drawing Sheets

400 # OUTLET WALL PLATE CHARGER APPARATUS

TECHNICAL FIELD

The embodiments relate to wall chargers, and more specifically to wall chargers having an integrated outlet wall plate.

BACKGROUND

Nearly all modern personal electronic devices operate with rechargeable batteries that require a 12 volt charging cable, while standard power outlets typically provide 110 or 220 volts and thus require a power adapter. Power outlets with integrated 12 volt adapters and USB charging ports are currently available but are significantly more expensive than standard power outlets and require electrical knowhow to be wired and installed.

Wall chargers with integrated power adapters occupy at least one receptacle of many power outlets throughout homes and offices. These chargers are often bulky, and aside from being unsightly may physically prevent the use of the adjacent receptacle. Furthermore, these chargers may easily be pulled or knocked out of the receptacle, interrupting power supply and potentially bending and damaging the charger blades.

SUMMARY OF THE INVENTION

This summary is provided to introduce a variety of concepts in a simplified form that is further disclosed in the detailed description. This summary is not intended to identify key or essential inventive concepts of the claimed subject matter, nor is it intended for determining the scope of the claimed subject matter.

The present embodiments disclose an outlet wall plate charger apparatus. The outlet wall plate charger apparatus includes a wall plate having a lower portion and an upper portion. The lower portion includes a mounting aperture and an outlet aperture extending therethrough. The mounting aperture is configured to receive a fastener to engage the wall plate to a standard power outlet and the outlet aperture is configured to receive a lower receptacle of the standard power outlet. The upper portion protrudes from an outer face of the lower portion and defines an upper cavity. The upper portion includes a top face having at least one cord slot extending from a wall edge of the wall plate. A charger is positioned within the upper cavity. The charger includes a charger body dimensioned to fit within the upper cavity and a pair of plug blades extending from the charger body past the wall edge. The plug blades are configured to engage a pair of sockets of an upper receptacle of the standard power outlet. An upper face of the charger body has at least one cable port, each being configured to receive a charging cable.

In one aspect, the charger body is dimensioned to fit within the upper cavity adjacent a bottom face of the upper portion. The upper face is sufficiently separated from the top face of the upper portion to accommodate a molded strain relief of the charging cables.

In one aspect, the charger is selectively removable from the upper cavity.

In one aspect, the lower portion includes a reinforcement wall perpendicularly extending from an inner face thereof. The reinforcement wall extends around a perimeter of each of the mounting aperture and the outlet aperture.

In one aspect, the mounting aperture is countersunk.

In one aspect, the at least one cord slot is a pair of cord slots and the at least one cable port is a pair of cable ports.

In one aspect, a lower left edge, a lower right edge, and a lower bottom edge of the lower portion are filleted.

In one aspect, the upper portion includes an upper left edge and an upper right edge extending between a front face and a left face and a right face, respectively. The upper left edge and the upper right edge may be filleted.

BRIEF DESCRIPTION OF THE DRAWINGS

A more complete understanding of the present invention and the advantages and features thereof will be more readily understood by reference to the following detailed description when considered in conjunction with the accompanying drawings wherein.

DETAILED DESCRIPTION

Figure 1:
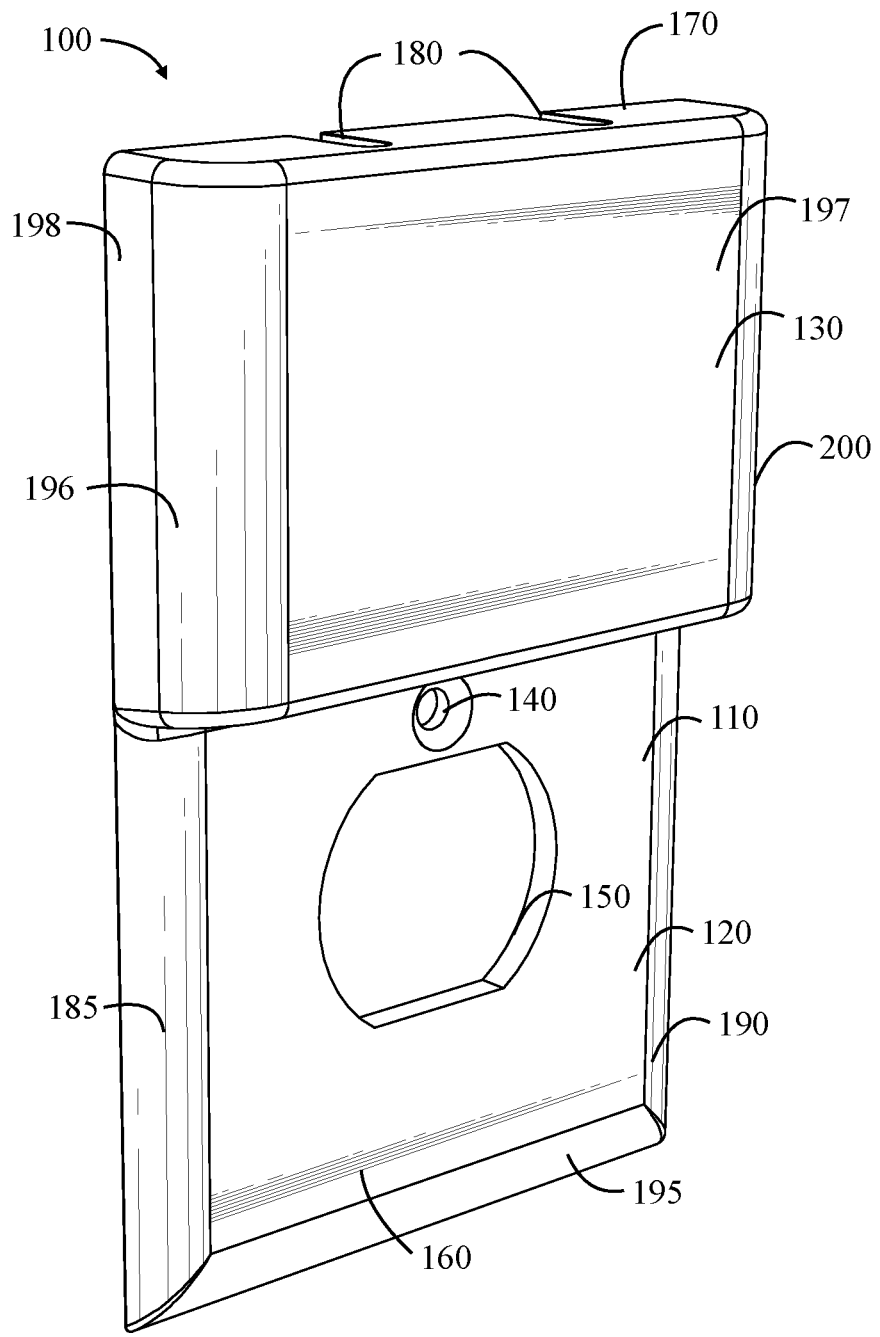
FIG. 1 illustrates a front perspective view of an outlet wall plate charger apparatus, according to some embodiments.
Figure 2:
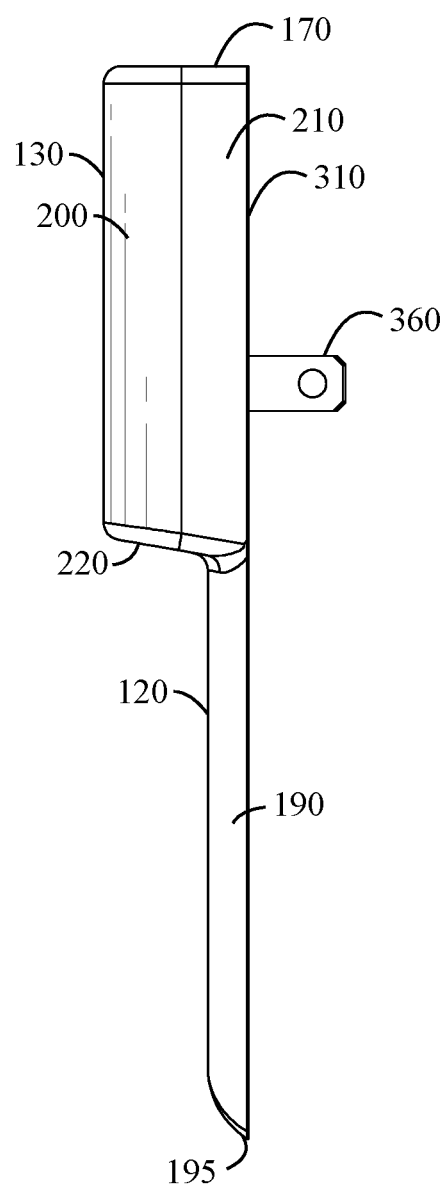
FIG. 2 illustrates a right side view of an outlet wall plate charger apparatus, according to some embodiments.

The specific details of the single embodiment or variety of embodiments described herein are to a system and method of use. Any specific details of the embodiments are used for demonstration purposes only and no unnecessary limitations or inferences are to be understood therefrom.

Before describing in detail exemplary embodiments, it is noted that the embodiments reside primarily in combinations of components related to the system and method. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second", "top" and bottom", and the like, may be used solely to distinguish one entity or element from another entity or element without necessarily requiring or implying any physical or logical relationship or order between such entities or elements.

Embodiments presented herein relate to an outlet wall plate charger apparatus 100 illustrated in FIG. 1 including a wall plate 110 having a lower portion 120 and an upper portion 130. The overall height and width of the wall plate 110 are dimensioned to match a traditional outlet wall plate. The lower portion 120 includes a mounting aperture 140 and an outlet aperture 150 extending therethrough. The mounting aperture 140 is centrally located on the wall plate 110 and is configured to receive a fastener 400 to engage the wall plate 110 to a standard power outlet as seen in FIG. 4. The outlet aperture 150 is configured to receive a lower receptacle 410 of the standard power outlet. The upper portion 130 protrudes from an outer face 160 of the lower portion and defines an upper cavity 300 best shown in FIG. 3. The upper portion 130 includes a top face 170 having at least one cord slot 180 extending from a wall edge 310 of the wall plate. The top face 170 may be horizontal.

Figure 3:
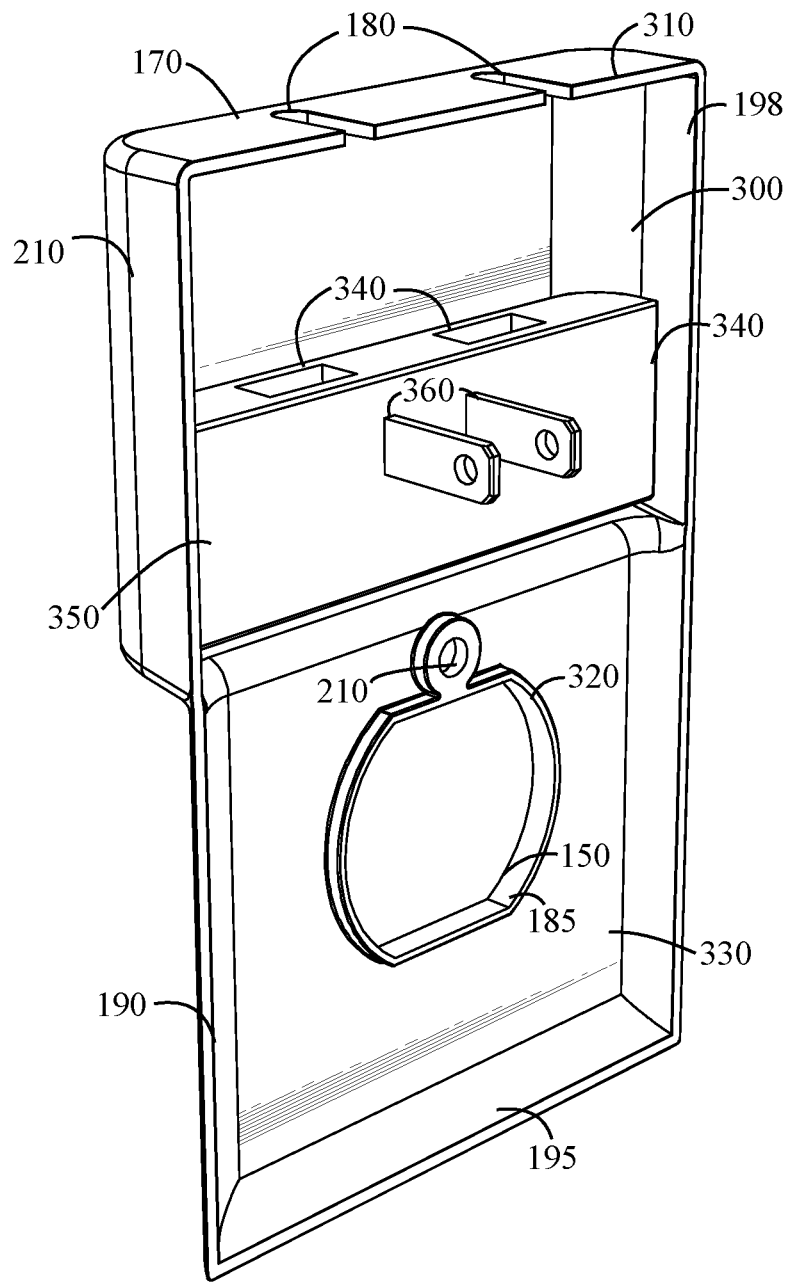
FIG. 3 illustrates a rear perspective view of an outlet wall plate charger apparatus, according to some embodiments.
Figure 4:
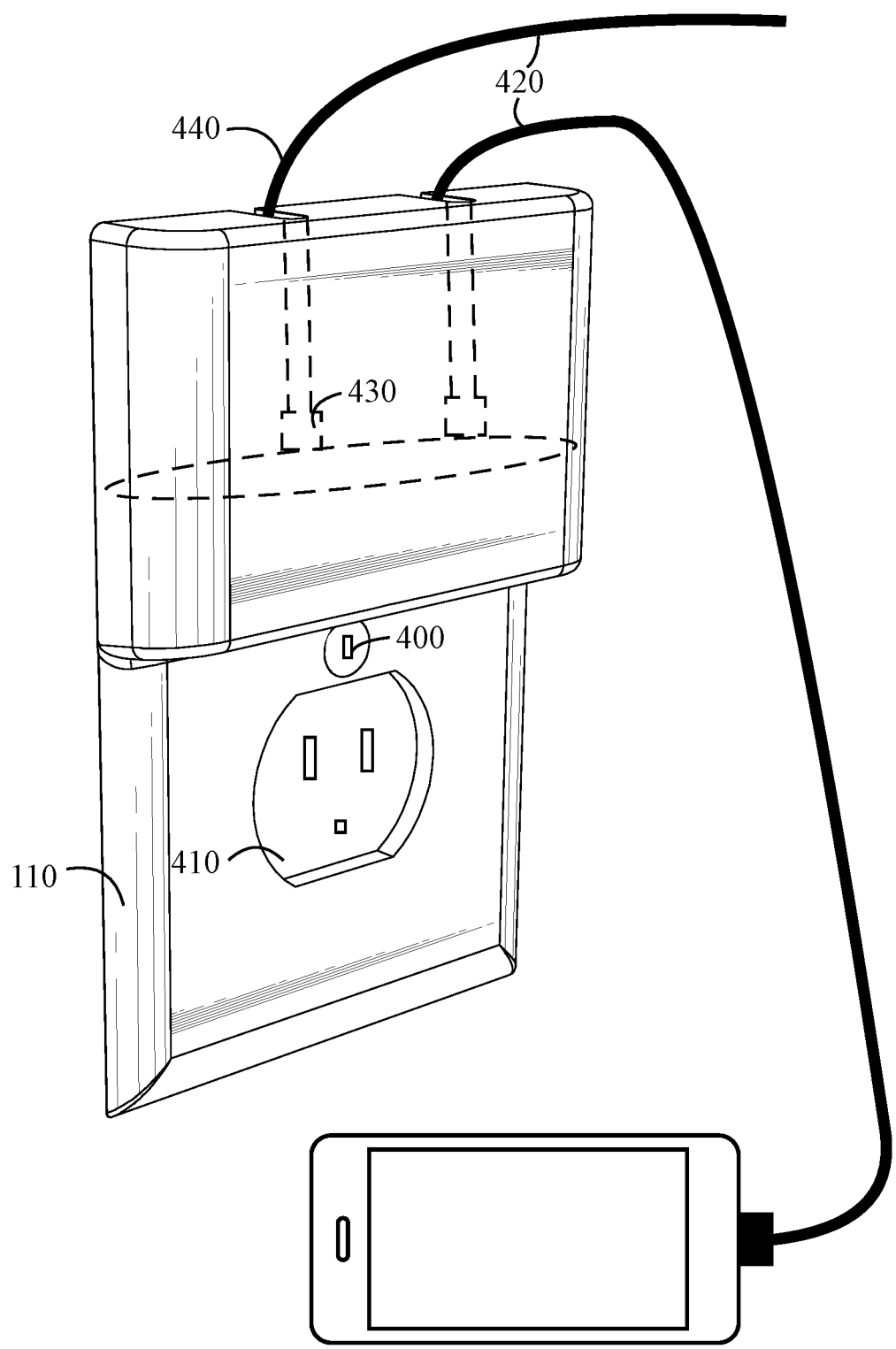
FIG. 4 illustrates an in-use view an outlet wall plate charger apparatus, according to some embodiments.

In some embodiments, the lower portion 120 includes a reinforcement wall 320 perpendicularly extending from an inner face 330 thereof (see FIG. 3). The reinforcement wall 320 extends around a perimeter of each of the mounting aperture 140 and the outlet aperture 150 to better receive the fastener 400 and the lower receptacle 410 while maintaining an overall thinness of the wall plate 110 to minimize material requirements.

In some embodiments, the mounting aperture 140 is countersunk to allow the fastener 400 to sit flush with the outer face 160.

In some embodiments, a lower left edge 185, a lower right edge 190, and a lower bottom edge 195 of the lower portion are filleted to offset the outer face 160 from the wall edge 310.

In some embodiments, the upper portion 130 includes an upper left edge 196 and an upper right edge 200 extending between a front face 197 and a left face 198 and a right face 210, respectively. The upper left edge 196 and the upper right edge 200 may be filleted and may complete 90° turns.

In some embodiments, a bottom face 220 of the upper portion lies in a plane forming an obtuse angle with a plane of the outer face 160 of the lower portion.

As illustrated in FIG. 3, a charger 340 is positioned within the upper cavity 300. The charger 340 includes a charger body 350 dimensioned to fit within the upper cavity 300 and a pair of plug blades 360 extending from the charger body 350 past the wall edge 310. The charger 340 may also include a grounding prong (not shown) extending from the charger body 350. The plug blades 360 and the grounding prong are configured to engage a pair of sockets of an upper receptacle of the standard power outlet. An upper face 370 of the charger body has at least one cable port 380, each being configured to receive a charging cable 420. The cable ports 380 may be USB ports. The charger 340 may be configured to convert 110 volt to 220 volt power from the standard power outlet to 12 volt power delivered to the cable ports 380.

In some embodiments, the charger 340 is selectively removable from the upper cavity 300. The user may thus manipulate the charger 340 independently to engage the charging cables 420 within the cable ports 380 and insert the plug blades 360 into the upper receptacle before installing the wall plate 110.

In some embodiments, the charger body 350 is dimensioned to fit within the upper cavity 300 adjacent the bottom face 220 of the upper portion. The upper face 370 is sufficiently separated from the top face 170 of the upper portion to accommodate a molded strain relief 430 of the charging cables.

In some embodiments, the at least one cord slot 180 is a pair of cord slots 180 and the at least one cable port 380 is a pair of cable ports 380. In use, the charging cables 420 are engaged within the cable ports 390 and a cord 440 of each charging cable is placed within the cord slots 180. Each cord slot 180 may have a rounded distal end 181 to prevent damage to the cord 440. A width of each cord slot may be configured to slidingly secure the cord 440 and impart friction so as to prevent the charging cable 420 from being accidently disengaged from the cable port 380 when tugged.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. An outlet wall plate charger apparatus, the outlet wall plate charger apparatus comprising:
a wall plate having a lower portion and an upper portion, the lower portion including a mounting aperture and an outlet aperture extending therethrough, the mounting aperture being configured to receive a fastener to engage the wall plate to a standard power outlet and the outlet aperture being configured to receive a lower receptacle of the standard power outlet, the upper portion protruding from an outer face of the lower portion and defining an upper cavity, the upper portion including a top face having at least one cord slot extending from a wall edge of the wall plate; and
a charger positioned within the upper cavity, the charger including a charger body dimensioned to fit within the upper cavity and a pair of plug blades extending from the charger body past the wall edge, the plug blades being configured to engage a pair of sockets of an upper receptacle of the standard power outlet, an upper face of the charger body having at least one cable port, each being configured to receive a charging cable.

2. The outlet wall plate charger apparatus of claim 1, wherein the charger body is dimensioned to fit within the upper cavity adjacent a bottom face of the upper portion, the upper face being sufficiently separated from the top face of the upper portion to accommodate a molded strain relief of the charging cables.

3. The outlet wall plate charger apparatus of claim 1, wherein the charger is selectively removable from the upper cavity.

4. The outlet wall plate charger apparatus of claim 1, wherein the lower portion includes a reinforcement wall perpendicularly extending from an inner face thereof around a perimeter of each of the mounting aperture and the outlet aperture.

5. The outlet wall plate charger apparatus of claim 4, wherein the mounting aperture is countersunk.

6. The outlet wall plate charger apparatus of claim 1, wherein the at least one cord slot is a pair of cord slots and the at least one cable port is a pair of cable ports.

7. The outlet wall plate charger apparatus of claim 1, wherein a lower left edge, a lower right edge, and a lower bottom edge of the lower portion are filleted.

8. The outlet wall plate charger apparatus of claim 7, wherein the upper portion includes an upper left edge and an upper right edge extending between a front face and a left face and a right face, respectively, the upper left edge and the upper right edge being filleted.

9. An outlet wall plate charger apparatus, the outlet wall plate charger apparatus comprising:
a wall plate having a lower portion and an upper portion, the lower portion including a mounting aperture and an outlet aperture extending therethrough, the mounting aperture being configured to receive a fastener to engage the wall plate to a standard power outlet and the outlet aperture being configured to receive a lower receptacle of the standard power outlet, the upper portion protruding from an outer face of the lower portion and defining an upper cavity, the upper portion including a top face having a pair of cord slots extending from a wall edge of the wall plate; and
a charger positioned within the upper cavity, the charger including a charger body dimensioned to fit within the upper cavity adjacent a bottom face of the upper portion with an upper face of the charger body being sufficiently separated from the top face of the upper portion to accommodate a molded strain relief of the charging cables, the charger including a pair of plug blades extending from the charger body past the wall edge, the plug blades being configured to engage a pair of sockets of an upper receptacle of the standard power outlet, the upper face having a pair of cable ports each configured to receive a charging cable, the charger being selectively removable from the upper cavity.

10. The outlet wall plate charger apparatus of claim 9, wherein the lower portion includes a reinforcement wall perpendicularly extending from an inner face thereof around a perimeter of each of the mounting aperture and the outlet aperture.

11. The outlet wall plate charger apparatus of claim 10, wherein the mounting aperture is countersunk.

12. The outlet wall plate charger apparatus of claim 9, wherein a lower left edge, a lower right edge, and a lower bottom edge of the lower portion are filleted.

13. The outlet wall plate charger apparatus of claim 12, wherein the upper portion includes an upper left edge and an upper right edge extending between a front face and a left face and a right face, respectively, the upper left edge and the upper right edge being filleted.

14. An outlet wall plate charger apparatus, the outlet wall plate charger apparatus comprising:
a wall plate having a lower portion and an upper portion, the lower portion including a mounting aperture and an outlet aperture extending therethrough, the mounting aperture being configured to receive a fastener to engage the wall plate to a standard power outlet and the outlet aperture being configured to receive a lower receptacle of the standard power outlet, the lower portion including a filleted lower left edge, a filleted lower right edge, and a filleted lower bottom edge, the upper portion protruding from an outer face of the lower portion and defining an upper cavity, the upper portion including a top face having a pair of cord slots extending from a wall edge of the wall plate, the upper portion including an upper left edge and an upper right edge extending between a front face and a left face and a right face, respectively, the upper left edge and the upper right edge being filleted; and
a charger positioned within the upper cavity, the charger including a charger body dimensioned to fit within the upper cavity adjacent a bottom face of the upper portion with an upper face of the charger body being sufficiently separated from the top face of the upper portion to accommodate a molded strain relief of the charging cables, the charger including a pair of plug blades extending from the charger body past the wall edge, the plug blades being configured to engage a pair of sockets of an upper receptacle of the standard power outlet, the upper face having a pair of cable ports each configured to receive a charging cable, the charger being selectively removable from the upper cavity.

15. The outlet wall plate charger apparatus of claim 14, wherein the lower portion includes a reinforcement wall perpendicularly extending from an inner face thereof around a perimeter of each of the mounting aperture and the outlet aperture.

16. The outlet wall plate charger apparatus of claim 15, wherein the mounting aperture is countersunk.

17. The outlet wall plate charger apparatus of claim 14, wherein the bottom face of the upper portion lies in a plane forming an obtuse angle with a plane of the outer face of the lower portion.

* * * * *